United States Patent
Li et al.

(10) Patent No.: US 12,256,435 B2
(45) Date of Patent: Mar. 18, 2025

(54) DATA SENDING METHOD, DATA RECEIVING METHOD, DEVICE, AND SYSTEM

(71) Applicant: Huawei Technologies Co., Ltd., Shenzhen (CN)

(72) Inventors: Jun Li, Shanghai (CN); Zhihu Luo, Beijing (CN); Xiaolei Tie, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 478 days.

(21) Appl. No.: 17/314,371

(22) Filed: May 7, 2021

(65) Prior Publication Data

US 2021/0266983 A1    Aug. 26, 2021

Related U.S. Application Data

(63) Continuation of application No. PCT/CN2019/116113, filed on Nov. 6, 2019.

(30) Foreign Application Priority Data

Nov. 9, 2018    (CN) .......................... 201811334542.7

(51) Int. Cl.
*H04W 74/0833*    (2024.01)
*H04W 72/21*    (2023.01)
*H04W 74/00*    (2009.01)

(52) U.S. Cl.
CPC ....... *H04W 74/0833* (2013.01); *H04W 72/21* (2023.01); *H04W 74/004* (2013.01)

(58) Field of Classification Search
CPC ............. H04W 74/0833; H04W 72/21; H04W 74/004; H04W 74/006; H04W 72/1268;
(Continued)

(56) References Cited

U.S. PATENT DOCUMENTS

| 9,577,792 B2 | 2/2017 | Kim et al. |
| 10,554,367 B2 | 2/2020 | Liu et al. |

(Continued)

FOREIGN PATENT DOCUMENTS

| CN | 107734680 A | 2/2001 |
| CN | 101779392 A | 7/2010 |

(Continued)

OTHER PUBLICATIONS

"UL Transmission in Preconfigured Resource," Agenda Item: 6.2.1.2, Source: Huawei, HiSilicon, Document for: Discussion and decision, 3GPP TSG RAN WG1 Meeting #94bis, R1-1810089, Chengdu, Oct. 8-12, 2018, 6 pages.

(Continued)

*Primary Examiner* — Jung H Park
(74) *Attorney, Agent, or Firm* — SLATER MATSIL, LLP

(57) ABSTRACT

A data sending method, a data receiving method, a device, and a system, the receiving method including receiving indication information from a network device, where the indication information indicates a first resource used to transmit uplink data, and where the first resource overlaps with a first early data transmission (EDT) physical random access channel resource, and delaying, in response to determining that a preset condition is satisfied, transmission of the uplink data, where the delaying transmission of the uplink data comprises sending the uplink data to the network device on a second resource, and where the second resource is non-overlapping with the first EDT physical random access channel resource.

16 Claims, 9 Drawing Sheets

(58) Field of Classification Search
CPC ... H04W 74/0866; H04W 72/23; H04W 4/70; H04W 28/02
See application file for complete search history.

(56) References Cited

U.S. PATENT DOCUMENTS

| | | | |
|---|---|---|---|
| 2019/0215872 A1* | 7/2019 | Park | H04W 52/0216 |
| 2019/0261247 A1 | 8/2019 | Wang et al. | |
| 2021/0036810 A1 | 2/2021 | Mu et al. | |
| 2021/0076306 A1* | 3/2021 | Tamura | H04W 8/24 |
| 2021/0400667 A1* | 12/2021 | Wei | H04L 5/001 |
| 2022/0053572 A1* | 2/2022 | Pham Van | H04W 68/005 |
| 2022/0418029 A1* | 12/2022 | Tirronen | H04W 72/23 |

FOREIGN PATENT DOCUMENTS

| | | |
|---|---|---|
| CN | 106936540 A | 7/2017 |
| CN | 107371184 A | 11/2017 |
| CN | 108024285 A | 5/2018 |
| CN | 108513714 A | 9/2018 |
| WO | 2008153298 A1 | 12/2008 |

OTHER PUBLICATIONS

"Mobile Terminated Early Data Transmission," Agenda Item: 9.14.2 Early Data Transmission, Source: Institute for Information Industry (III), Document for: Discussion, Decision, 3GPP TSG-RAN WG2 Meeting#103, R2-1811885, Gothenburg, Sweden, Aug. 20-24, 2018, 3 pages.

"3rd Generation Partnership Project; Technical Specification Group Radio Access Network; Evolved Universal Terrestrial Radio Access (E-UTRA); Physical channels and modulation (Release 15)," 3GPP TS 36.211 V15.3.0, Sep. 2018, 237 pages.

"3rd Generation Partnership Project; Technical Specification Group Radio Access Network; Evolved Universal Terrestrial Radio Access (E-UTRA); Physical layer procedures (Release 15)," 3GPP TS 36.213 V15.3.0, Sep. 2018, 546 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15)," 3GPP TS 36.300 V15.3.0, Sep. 2018, 358 pages.

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.3.0, Sep. 2018, 127 pages.

"Discussion on Collision of NPUSCH and Rel-15 NPRACH Resources," Agenda item: 6.1.5.4, Source: Qualcomm Incorporated, Document for: Discussion and Decision, 3GPP TSG-RAN WG1 Meeting #94bis, R1-1810913, Chengdu, China, Oct. 8-12, 2018, 3 pages.

"Discussion on Collision of NPUSCH and Rel-15 NPRACH Resources," Agenda item: 6.1.5, Source: Qualcomm Incorporated, Document for: Discussion and Decision, 3GPP TSG RAN WG1 Meeting #95, R1-1813035, Spokane, USA, Nov. 12-16, 2018, 2 pages.

"Feature Lead Summary of EDT During RACH in feNB-IoT," Agenda Item; 6.2.7.1.2, Source: Huawei, HiSilicon, Document for: Discussion and Decision, 3GPP TSG RAN WG1 Meeting #93, R1-1807473, Busan, Korea, May 21-25, 2018, 16 pages.

ZTE, R1-165132, "On collision between NPRACH and NPUSCH", 3GPP TSG RAN WG1 #85 (3GPP server publication date: May 14, 2016), total: 4 pages.

* cited by examiner

DATA SENDING METHOD, DATA RECEIVING METHOD, DEVICE, AND SYSTEM

CROSS-REFERENCE TO RELATED APPLICATIONS

This application is a continuation of International Application No. PCT/CN2019/116113, filed on Nov. 6, 2019, which claims priority to Chinese Patent Application No. 201811334542.7, filed on Nov. 9, 2018. The disclosures of the aforementioned applications are hereby incorporated by reference in their entireties.

TECHNICAL FIELD

This application relates to the field of communications technologies, and in particular, to a data sending method, a data receiving method, a device, and a system.

BACKGROUND

With development of internet of things (IoT) technologies, IoT applications impose increasingly high requirements on IoT designs. To meet these requirements, the 3rd generation partnership project (3GPP), which is a mobile communications standards organization, approved a new research topic at the radio access network (RAN) #62 plenary meeting to study a method for supporting an internet of things having extremely low complexity and low costs in a cellular network, and initiated a narrowband internet of things (NB-IoT) topic at the RAN #69 meeting.

Currently, an early data transmission (EDT) feature has been introduced into an NB-IoT system. The EDT feature is an optional feature for a terminal device in the NB-IoT system. To be specific, the terminal device in the NB-IoT system may select to support the EDT feature, or may select not to support the EDT feature. The EDT feature includes user plane EDT (UP-EDT) and control plane EDT (CP-EDT). The UP-EDT has a capability reporting mechanism. To be specific, when the terminal device selects to support the UP-EDT, the terminal device notifies a network device that the terminal device supports the UP-EDT. Therefore, the network device can learn whether the terminal device supports the UP-EDT. However, the CP-EDT does not have the capability reporting mechanism. To be specific, regardless of whether the terminal device supports the CP-EDT, the terminal device does not notify the network device. Therefore, the network device cannot learn whether the terminal device supports the CP-EDT.

In a current technology, when a terminal device does not support the UP-EDT, because the network device does not know whether the terminal device supports the CP-EDT, the network device does not know whether the terminal device supports EDT. Considering that a terminal device that does not support the EDT cannot receive EDT-narrowband physical random access channel (EDT-NPRACH) configuration information, and therefore cannot send uplink data to the network device in an existing delaying or postponing manner, the network device schedules an EDT-NPRACH in a manner in which the terminal device does not support the EDT. To be specific, as shown in FIG. 1, an EDT-NPRACH resource sent by the network device to the terminal device is completely separated from a narrowband physical uplink shared channel (NPUSCH) resource indicated by the network device to the terminal device. Therefore, the terminal device can send the uplink data to the network device on the NPUSCH resource indicated by the network device.

However, because the EDT-NPRACH resource needs to be completely separated from the NPUSCH resource in the foregoing solution, flexibility of scheduling performed by the network device is limited to some extent. Therefore, how to improve the flexibility of the scheduling performed by the network device during data transmission is a problem that urgently needs to be resolved currently.

SUMMARY

Embodiments of this application provide a data sending method, a data receiving method, a device, and a system, to improve flexibility of scheduling performed by a network device during data transmission.

To achieve the foregoing objective, the following technical solutions are used in the embodiments of this application.

According to a first aspect, a data sending method is provided. The method includes receiving, by a terminal device, indication information from a network device, where the indication information indicates a first resource used to transmit uplink data, and the first resource overlaps with an early data transmission EDT physical random access channel resource, and when determining that a preset condition is satisfied, delaying, by the terminal device, sending the uplink data to the network device on a second resource, where the second resource does not overlap with the EDT physical random access channel resource. It is different from a current technology that when the terminal device supports CP-EDT, but the network device does not know whether the terminal device supports EDT, an EDT-NPRACH resource needs to be completely separated from an NPUSCH resource, thereby limiting flexibility of scheduling performed by the network device. In this embodiment of this application, the first resource used to transmit the uplink data may overlap with the EDT physical random access channel resource. The EDT physical random access channel resource may be, for example, the EDT-NPRACH resource, and the first resource may be, for example, the NPUSCH resource. When the first resource overlaps with the EDT physical random access channel resource, if the terminal device determines that the preset condition is satisfied, the terminal device delays sending the uplink data to the network device on the second resource. In other words, if the terminal device determines that the preset condition is satisfied, it may be considered that the terminal device supports the EDT. In this case, the first resource may overlap with the EDT physical random access channel resource, and the terminal device may send the uplink data to the network device in a postponing manner. Therefore, during data transmission, the flexibility of the scheduling performed by the network device can be improved, and a waste of resources can further be reduced.

Optionally, a communications device that performs the method may be a terminal device, or may be a module, for example, a chip, used in a terminal device. The following provides description by using an example in which the method is performed by the terminal device.

In a possible design, the indication information is carried in a random access response (RAR).

In a possible design, the preset condition includes the terminal device sends a random access preamble on the EDT physical random access channel resource, and the terminal device receives the random access response (RAR) from the network device, or the preset condition includes the terminal device has performed an EDT procedure. The preset condition is used to represent that the terminal device supports the EDT.

It should be noted that, to distinguish the foregoing EDT physical random access channel resource from a following second EDT physical random access channel resource, the foregoing EDT physical random access channel resource may also be referred to as a first EDT physical random access channel resource. This is described herein, and details are not described below again.

In a possible design, the preset condition includes before receiving the indication information from the network device, the terminal device sends a random access preamble to the network device on the second EDT physical random access channel resource, or the preset condition includes transmission of the uplink data belongs to an EDT process. The preset condition is used to represent that the terminal device supports the EDT.

According to a second aspect, a data receiving method is provided. The method includes when determining that a preset condition is satisfied, sending, by a network device, indication information to a terminal device, where the indication information indicates a first resource used to receive uplink data, and the first resource overlaps with an early data transmission EDT physical random access channel resource, and delaying, by the network device, receiving the uplink data from the terminal device on a second resource, where the second resource does not overlap with the EDT physical random access channel resource. It is different from a current technology that when the terminal device supports CP-EDT, but the network device does not know whether the terminal device supports EDT, an EDT-NPRACH resource needs to be completely separated from an NPUSCH resource, thereby limiting flexibility of scheduling performed by the network device. In this embodiment of this application, the first resource used to transmit the uplink data may overlap with the EDT physical random access channel resource. The EDT physical random access channel resource may be, for example, the EDT-NPRACH resource, and the first resource may be, for example, the NPUSCH resource. When the first resource overlaps with the EDT physical random access channel resource, if the network device determines that the preset condition is satisfied, the network device delays receiving the uplink data from the terminal device on the second resource. In other words, if the network device determines that the preset condition is satisfied, it may be considered that the terminal device supports the EDT. In this case, the first resource may overlap with the EDT physical random access channel resource, and the terminal device may send the uplink data to the network device in a postponing manner. Therefore, during data transmission, the flexibility of the scheduling performed by the network device can be improved, and a waste of resources can further be reduced.

Optionally, a communications device that performs the method may be a network device, or may be a module, for example, a chip, used in a network device. The following provides description by using an example in which the method is performed by the network device.

In a possible design, the indication information is carried in a random access response (RAR).

In a possible design, the preset condition includes the network device receives a random access preamble on the EDT physical random access channel resource, and the network device sends the random access response (RAR) to the terminal device, or the preset condition includes the network device determines that the terminal device has performed an EDT procedure. The preset condition is used to represent that the terminal device supports the EDT. Based on the preset condition, the network device may learn that the terminal device supports the EDT.

It should be noted that, to distinguish the foregoing EDT physical random access channel resource from a following second EDT physical random access channel resource, the foregoing EDT physical random access channel resource may also be referred to as a first EDT physical random access channel resource. This is described herein, and details are not described below again.

In a possible design, the preset condition includes before sending the indication information to the terminal device, the network device receives a random access preamble from the terminal device on the second EDT physical random access channel resource, or the preset condition includes transmission of the uplink data belongs to an EDT process. The preset condition is used to represent that the terminal device supports the EDT.

With reference to the first aspect or the second aspect, in a possible design, the second resource includes m first resource blocks, and the EDT physical random access channel resource includes m second resource blocks, where a start position of an $i^{th}$ first resource block in the m first resource blocks is a next resource position of an end position of an $i^{th}$ second resource block in the m second resource blocks, m is a positive integer, and i is a positive integer not greater than m. According to this solution, when a start position of the first resource overlaps with the EDT physical random access channel resource, a start position of each first resource block may be determined.

With reference to the first aspect or the second aspect, in a possible design, an end position of a $j^{th}$ first resource block in the m first resource blocks is a previous resource position of a start position of a $(j+1)^{th}$ second resource block in the m second resource blocks, and j is a positive integer less than m. According to this solution, when the start position of the first resource overlaps with the EDT physical random access channel resource, an end position of each first resource block may be determined.

With reference to the first aspect or the second aspect, in a possible design, the second resource includes n+1 first resource blocks, and the EDT physical random access channel resource includes n second resource blocks, where a start position of the first first resource block in the n+1 first resource blocks is the same as a start position of the first resource, and a start position of an $(i+1)^{th}$ first resource block in the n+1 first resource blocks is a next resource position of an end position of an $i^{th}$ second resource block in the n second resource blocks, n is a positive integer, and i is a positive integer not greater than n. According to this solution, when the start position of the first resource does not overlap with the EDT physical random access channel resource, a start position of each first resource block may be determined.

With reference to the first aspect or the second aspect, in a possible design, an end position of a $j^{th}$ first resource block in the n+1 first resource blocks is a previous resource position of a start position of a $j^{th}$ second resource block in the n second resource blocks, and j is a positive integer not greater than n. According to this solution, when the start position of the first resource does not overlap with the EDT physical random access channel resource, an end position of each first resource block may be determined.

According to a third aspect, a terminal device is provided. The terminal device has a function of implementing the method according to the first aspect. The function may be implemented by hardware, or may be implemented by hardware executing corresponding software. The hardware or the software includes one or more modules corresponding to the function.

According to a fourth aspect, a terminal device is provided. The terminal device includes a processor and a memory. The memory is configured to store computer-executable instructions. When the terminal device runs, the processor executes the computer-executable instructions stored in the memory, so that the terminal device performs the data sending method according to any one of the possible designs of the first aspect.

According to a fifth aspect, a terminal device is provided. The terminal device includes a processor. The processor is configured to after being coupled to a memory and reading instructions in the memory, perform the data sending method according to any one of the possible designs of the first aspect according to the instructions.

According to a sixth aspect, a computer-readable storage medium is provided. The computer-readable storage medium stores instructions. When the instructions are run on a computer, the computer is enabled to perform the data sending method according to any one of the possible designs of the first aspect.

According to a seventh aspect, a computer program product including instructions is provided. When the computer program product runs on a computer, the computer is enabled to perform the data sending method according to any one of the possible designs of the first aspect.

According to an eighth aspect, an apparatus (for example, the apparatus may be a chip system) is provided. The apparatus includes a processor, configured to support a terminal device in implementing the function in the first aspect, for example, determining that a preset condition is satisfied. In a possible design, the apparatus further includes a memory. The memory is configured to store program instructions and data that are necessary for the terminal device. When the apparatus is a chip system, the apparatus may include a chip, or may include a chip and another discrete component.

For technical effects brought by any one of the designs of the third aspect to the eighth aspect, refer to technical effects brought by different designs of the first aspect. Details are not described herein again.

According to a ninth aspect, a network device is provided. The network device has a function of implementing the method according to the second aspect. The function may be implemented by hardware, or may be implemented by hardware executing corresponding software. The hardware or the software includes one or more modules corresponding to the function.

According to a tenth aspect, a network device is provided. The network device includes a processor and a memory. The memory is configured to store computer-executable instructions. When the network device runs, the processor executes the computer-executable instructions stored in the memory, so that the network device performs the data receiving method according to any one of the possible designs of the second aspect.

According to an eleventh aspect, a network device is provided. The network device includes a processor. The processor is configured to after being coupled to a memory and reading instructions in the memory, perform the data receiving method according to any one of the possible designs of the second aspect according to the instructions.

According to a twelfth aspect, a computer-readable storage medium is provided. The computer-readable storage medium stores instructions. When the instructions are run on a computer, the computer is enabled to perform the data receiving method according to any one of the possible designs of the second aspect.

According to a thirteenth aspect, a computer program product including instructions is provided. When the computer program product runs on a computer, the computer is enabled to perform the data receiving method according to any one of the possible designs of the second aspect.

According to a fourteenth aspect, an apparatus (for example, the apparatus may be a chip system) is provided. The apparatus includes a processor, configured to support a network device in implementing the function in the second aspect, for example, determining that a preset condition is satisfied. In a possible design, the apparatus further includes a memory. The memory is configured to store program instructions and data that are necessary for the network device. When the apparatus is a chip system, the apparatus may include a chip, or may include a chip and another discrete component.

For technical effects brought by any one of the designs of the ninth aspect to the fourteenth aspect, refer to technical effects brought by different designs of the second aspect. Details are not described herein again.

According to a fifteenth aspect, a communications system is provided. The communications system includes a network device and one or more terminal devices connected to the network device. The network device is configured to perform the steps performed by the network device in the solutions provided in the second aspect or the embodiments of this application, and the terminal device is configured to perform the steps performed by the terminal device in the solutions provided in the first aspect or the embodiments of this application.

It should be noted that the terminal device or the network device in the foregoing embodiments of this application may also be referred to as a communications device. This is described herein, and details are not described below again.

DETAILED DESCRIPTION OF ILLUSTRATIVE EMBODIMENTS

For ease of understanding of technical solutions in embodiments of this application, the following first briefly describes technologies related to this application.

First, for an IoT, an IoT is an internet in which all things are interconnected. In the IoT, user ends of the internet are expanded between any things, so that information exchange and communication can be performed between any things. Such a communication manner is also referred to as machine type communication (MTC). A node for communication is referred to as an MTC terminal or an MTC device. Typical IoT applications include a smart grid, smart agriculture, smart transportation, smart household, environment detection, and the like.

The internet of things needs to be applied to a plurality of scenarios, for example, from outdoor to indoor, and from ground to underground. Therefore, many special requirements are imposed on a design of the internet of things. For example, in some scenarios, an MTC terminal is used in an environment with relatively poor coverage. For example, an electricity meter, a water meter, or the like is usually mounted in a place with a poor wireless network signal, such as mounted in an indoor area or even in a basement. Therefore, a coverage enhancement technology is required to resolve this problem. Alternatively, in some scenarios, because a quantity of MTC terminals is far greater than a quantity of devices used for human-to-human communication, that is, large-scale deployment is required, the MTC terminal needs to be obtained and used at extremely low costs. Alternatively, in some scenarios, because a data packet transmitted by an MTC terminal is very small and the MTC terminal is not sensitive to a delay, the MTC terminal that supports a low rate is required. Alternatively, in most cases, an MTC terminal is powered by a battery. However, in many scenarios, the MTC terminal needs to be used for more than to years without replacing the battery. In this case, the MTC terminal needs to work with extremely low power consumption.

To meet the foregoing requirements, the 3GPP, which is a mobile communications standards organization, approved a new research topic at the RAN #62 plenary meeting to study a method for supporting the internet of things having extremely low complexity and low costs in a cellular network, and initiated an NB-IoT topic at the RAN #69 meeting.

Figure 2:
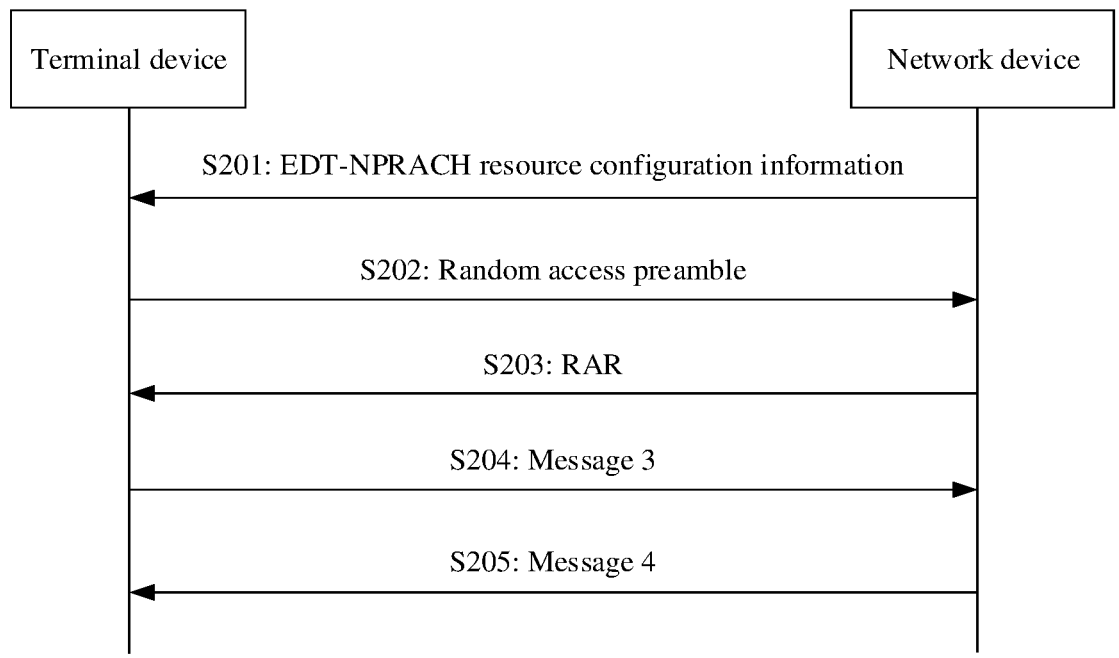
FIG. 2 is a schematic diagram of an existing EDT procedure.

Second, for EDT, FIG. 2 is a schematic diagram of an existing EDT procedure. The existing EDT procedure includes the following steps.

S201: A network device sends EDT-NPRACH resource configuration information to a terminal device. Correspondingly, the terminal device receives the EDT-NPRACH resource configuration information from the network device.

The network device may send the EDT-NPRACH resource configuration information to the terminal device by using a system message. The EDT-NPRACH resource configuration information may include a parameter nprach-ParametersListFmt2EDT-r15 or a parameter nprach-ParametersListEDT-r15. This is not specifically limited in this embodiment of this application.

An EDT-NPRACH resource is an NPRACH resource used by the terminal device to request early data transmission.

Figure 1:
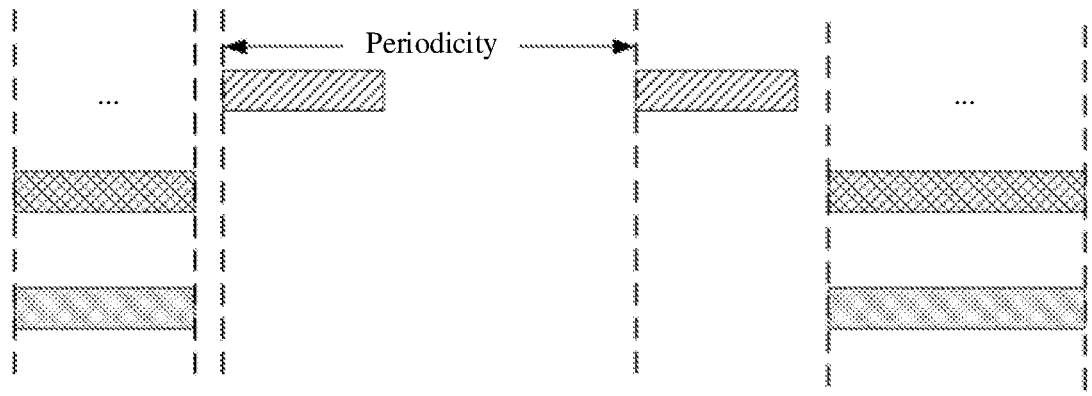
FIG. 1 is a schematic diagram in which an EDT-NPRACH resource is completely separated from an NPUSCH resource.

In addition, the EDT-NPRACH resource in this embodiment of this application and the following embodiments is a periodic resource. For example, FIG. 1 only shows two periodic EDT-NPRACH resources as an example. This is described herein, and details are not described below again.

S202: The terminal device sends a preamble (preamble) to the network device on the EDT-NPRACH resource based on the EDT-NPRACH resource configuration information. Correspondingly, the network device receives the preamble from the terminal device on the EDT-NPRACH resource.

S203: The network device sends a random access response (random access response) to the terminal device. Correspondingly, the terminal device receives the RAR from the network device.

The RAR includes an uplink (UL) grant, and the UL grant indicates a resource used to transmit a message 3.

S204: The terminal device sends the message 3 (msg3) to the network device. Correspondingly, the network device receives the message 3 from the terminal device.

S205: The network device sends a message 4 (msg4) to the terminal device. Correspondingly, the terminal device receives the message 4 from the network device.

As described in the background, an EDT feature includes UP-EDT and CP-EDT. If the terminal device supports the CP-EDT, the message 3 in step S204 may be specifically a radio resource control (RRC) early data request message, and the message 4 in step S205 may be specifically an RRC early data complete message. Alternatively, if the terminal device supports the UP-EDT, the message 3 in step S204 may be specifically an RRC connection resume request message, and the message 4 in step S205 may be specifically an RRC connection release message.

The message 3 in step S204 may alternatively be an RRC connection request-NB (narrowband) message, an RRC connection reestablishment request-NB message, an RRC connection resume request-NB message, or the like. The message 4 may alternatively be an RRC connection setup-NB message, an RRC connection resume-NB message, an RRC connection reestablishment-NB message, or the like. That is, it indicates that the terminal device may fall back to a legacy random access process (legacy RACH). This is not specifically limited in this embodiment of this application.

It should be noted that description is provided by using an example in which the EDT procedure shown in FIG. 2 is applied to an NB-IoT system. The EDT procedure may also be applied to an enhanced MTC (eMTC) system. In this case, a corresponding EDT procedure is similar to that in FIG. 2. For example, a difference lies in that the EDT-NPRACH resource in the NB-IoT system is replaced with an EDT random access resource that is in the eMTC system and that is configured by using edt-PRACH-ParametersListCE-r15 or EDT-PRACH-ParametersCE-r15 IE. In addition, a random access channel in the eMTC system is a PRACH.

For other information, refer to the embodiment shown in FIG. 2. Details are not described herein again.

Third, for downlink control information (DCI), the DCI includes a scheduling delay field used to indicate a start position of an NPUSCH, a resource allocation field used to indicate a quantity of resource units (resource unit, RU), and a repetition quantity field used to indicate a repetition quantity of data. The RU includes a plurality of resource elements (resource element, RE). The RE occupies one single-carrier frequency division multiple access (single-carrier frequency-division multiple access, SC-FDMA) symbol in time domain, and occupies one subcarrier in frequency domain. A definition of the RU is that the RU occupies $N_{sc}^{RU}$ subcarriers in frequency domain, and occupies $N_{slots}^{UL}$ slots in time domain. Each slot includes $N_{symb}^{UL}$ SC-FDMA symbols. For a frequency division duplex (frequency division duplexing, FDD) NB-IoT system, $N_{symb}^{UL}$, $N_{sc}^{RU}$, and $N_{slots}^{UL}$ are separately shown in Table 1. For a time division duplex (time division duplexing, TDD) NB-IoT system, $N_{symb}^{UL}$, $N_{sc}^{RU}$, and $N_{slots}^{UL}$ are separately shown in Table 2.

TABLE 1

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

TABLE 2

| NPUSCH format | Δf | Supported uplink or downlink configuration | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

Each configuration manner in the supported uplink or downlink configuration in Table 2 may be shown in Table 3. A total of seven configuration manners are included, and the seven configuration manners are a configuration manner 0 to a configuration manner 6. D represents a downlink subframe, S represents a special subframe, and U represents an uplink subframe.

TABLE 3

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | S | D |
| 4 | 10 ms | D | S | U | U | D | D | D | D | S | D |
| 5 | 10 ms | D | S | U | D | D | D | D | D | S | D |
| 6 | 5 ms | D | S | U | U | U | D | S | U | U | D |

Figure 3:
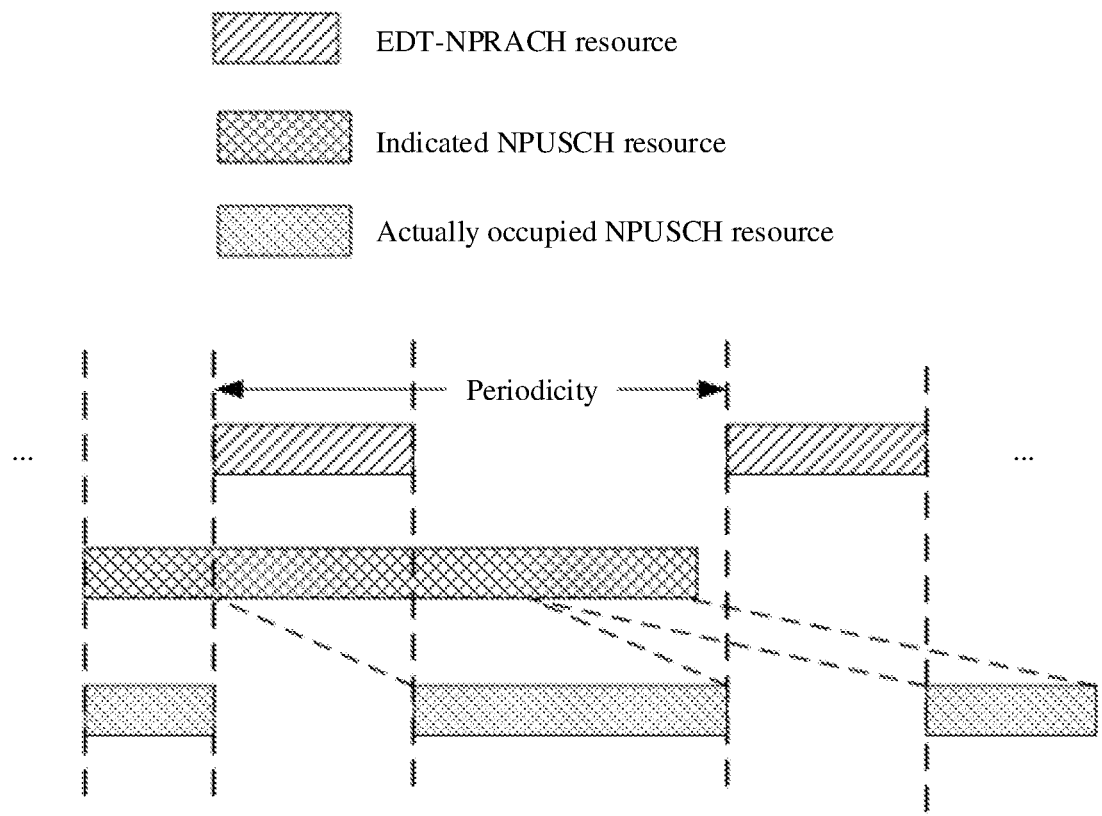
FIG. 3 is a schematic diagram in which an EDT-NPRACH resource is completely separated from an NPUSCH resource in a postponing manner.

Fourth, for a postponing manner, FIG. 3 is a schematic diagram in which an EDT-NPRACH resource is separated from an NPUSCH resource in a postponing manner. That is, when an EDT-NPRACH resource configured by a network device overlaps with an NPUSCH resource indicated by the network device, the NPUSCH resource actually used to transmit uplink data is separated from the EDT-NPRACH resource configured by the network device.

The following describes the technical solutions in the embodiments of this application with reference to accompanying drawings in the embodiments of this application. In the description of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the description of this application means two or more. The term "at least one of the following items (pieces)" or an expression similar to the term indicates any combination of the items, and includes a single item (piece) or any combination of a plurality of items (pieces). For example, at least one of a, b, or c may indicate: a, b, c; a and b; a and c; b and c; or a, b, and c, where a, b, and c may be singular or plural. In addition, for convenience of clear description of the technical solutions in the embodiments of this application, in the embodiments of this application, terms such as "first", "second", and the like are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 4:
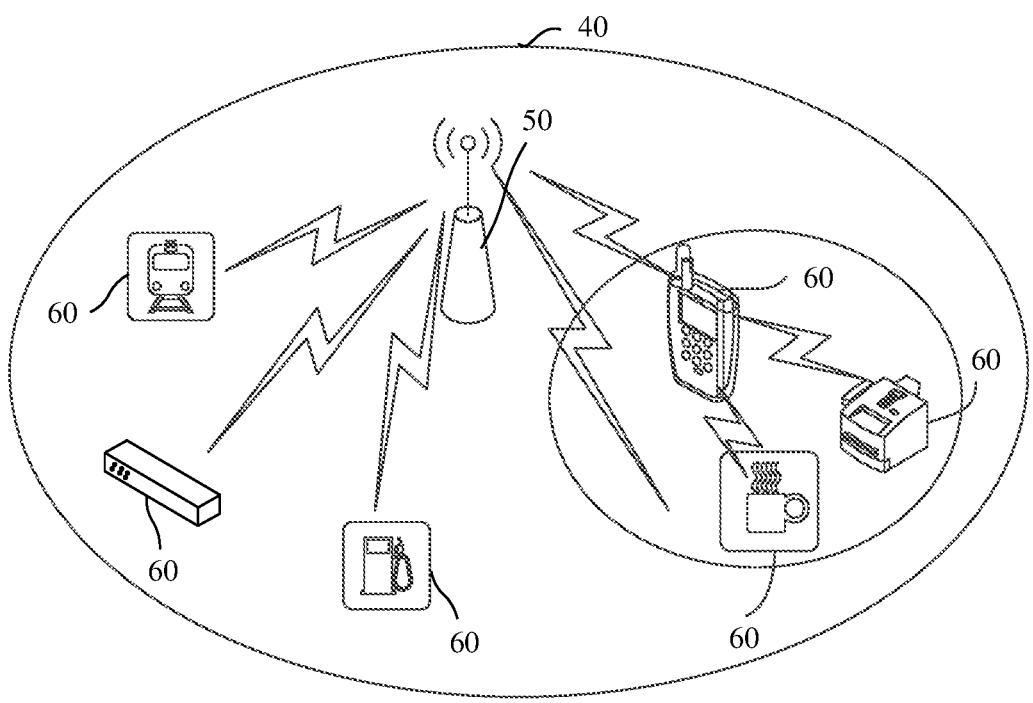
FIG. 4 is a schematic diagram of an architecture of a communications system according to an embodiment of this application.

FIG. 4 shows a communications system 40 according to an embodiment of this application. The communications system 40 includes a network device 50 and one or more terminal devices 60 connected to the network device 50. The following uses interaction between the network device 50 and any terminal device 60 as an example for description.

When determining that a second preset condition is satisfied, the network device 50 sends indication information to the terminal device 60, where the indication information indicates a first resource used to transmit uplink data, and the first resource overlaps with an EDT physical random access channel resource. Correspondingly, the terminal device 60 receives the indication information from the network device 50. Further, when determining that a first preset condition is satisfied, the terminal device 60 delays sending the uplink data to the network device 50 on a second resource. Correspondingly, the network device 50 delays receiving the uplink data from the terminal device 60 on the second resource.

A specific implementation of the foregoing solution is described in detail in the following embodiment, and is not described herein again.

It is different from a current technology that when the terminal device supports CP-EDT, but the network device does not know whether the terminal device supports EDT, an EDT-NPRACH resource needs to be completely separated from an NPUSCH resource, thereby limiting flexibility of scheduling performed by the network device. In this embodiment of this application, the first resource used to transmit the uplink data may overlap with the EDT physical random access channel resource. The EDT physical random access channel resource may be, for example, the EDT-NPRACH resource, and the first resource may be, for example, the NPUSCH resource. When the first resource overlaps with the EDT physical random access channel resource, if the terminal device determines that the first preset condition is satisfied, or if the network device determines that the second preset condition is satisfied, the terminal device delays sending the uplink data to the network device on the second resource. Correspondingly, the network device delays receiving the uplink data from the terminal device on the second resource. In other words, if the terminal device determines that the first preset condition is satisfied, or if the network device determines that the second preset condition is satisfied, it may be considered that the terminal device supports the EDT. In this case, the first resource may overlap with the EDT physical random access channel resource, and the terminal device may send the uplink data to the network device in a postponing manner. Therefore, during data transmission, the flexibility of the scheduling performed by the network device can be improved, and a waste of resources can further be reduced.

Figure 5:
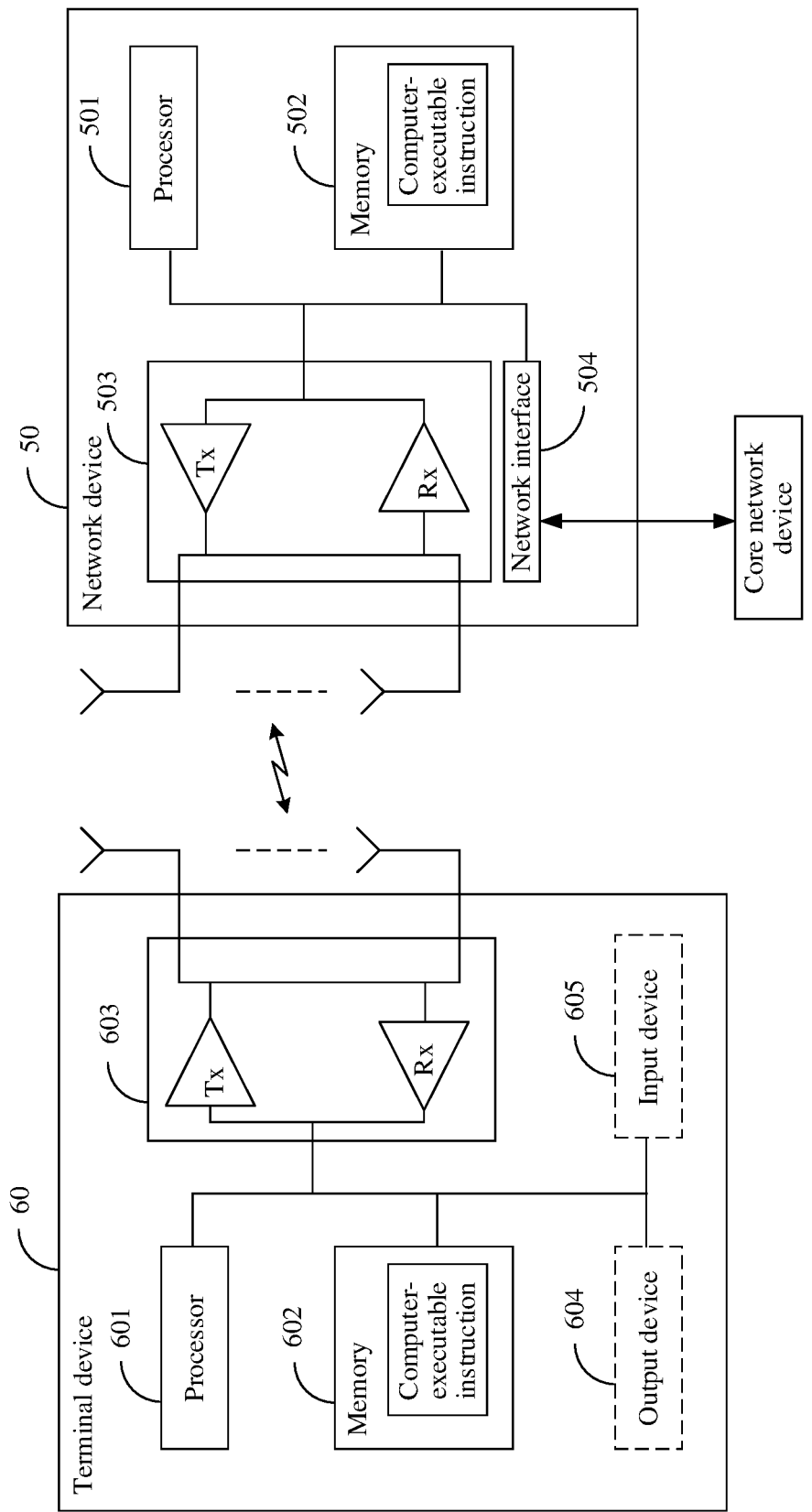
FIG. 5 is a schematic diagram of structures of a terminal device and a network device according to an embodiment of this application.

FIG. 5 is a schematic diagram of hardware structures of the network device 50 and the terminal device 60 according to an embodiment of this application.

The terminal device 60 includes at least one processor 601 (for example, one processor 601 is included in FIG. 5 for description), at least one memory 602 (for example, one memory 602 is included in FIG. 5 for description), and at least one transceiver 603 (for example, one transceiver 603 is included in FIG. 5 for description). Optionally, the terminal device 60 may further include an output device 604 and an input device 605.

The processor 601, the memory 602, and the transceiver 603 are connected through a communications line. The communications line may include a path transmitting information between the foregoing components.

The processor 601 may be a general-purpose central processing unit (CPU), a microprocessor, an application-specific integrated circuit (ASIC), or one or more integrated circuits for controlling program execution of the solutions in this application. In a specific implementation, in an embodiment, the processor 601 may further include a plurality of CPUs, and the processor 601 may be a single-core (single-CPU) processor or a multi-core (multi-CPU) processor. The processor herein may refer to one or more devices, circuits, or processing cores configured to process data (for example, computer program instructions).

The memory 602 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 602 is not limited thereto. The memory 602 may exist independently, and is connected to the processor 601 through the communications line. Alternatively, the memory 602 may be integrated with the processor 601.

The memory 602 is configured to store computer-executable instructions for performing the solutions in this application, and execution of the computer-executable instructions is controlled by the processor 601. Specifically, the processor 601 is configured to execute the computer-executable instructions stored in the memory 602, to implement the data sending and receiving method in the embodiments of this application. Optionally, the computer-executable instructions in this embodiment of this application may also be referred to as application program code or computer program code. This is not specifically limited in this embodiment of this application.

The transceiver 603 may use any apparatus such as a transceiver, and is configured to communicate with another device or a communications network such as an ethernet, a radio access network (RAN), or a wireless local area network (WLAN). The transceiver 603 includes a transmitter (Tx) and a receiver (Rx).

The output device 604 communicates with the processor 601, and may display information in a plurality of manners. For example, the output device 604 may be a liquid crystal display (LCD), a light emitting diode (LED) display device, a cathode ray tube (CRT) display device, or a projector.

The input device 605 communicates with the processor 601, and may receive an input of a user in a plurality of manners. For example, the input device 605 may be a mouse, a keyboard, a touchscreen device, or a sensing device.

The network device 50 includes at least one processor 501 (for example, one processor 501 is included in FIG. 5 for description), at least one memory 502 (for example, one memory 502 is included in FIG. 5 for description), at least one transceiver 503 (for example, one transceiver 503 is included in FIG. 5 for description), and at least one network interface 504 (for example, one network interface 504 is included in FIG. 5 for description). The processor 501, the memory 502, the transceiver 503, and the network interface 504 are connected through a communications line. The network interface 504 is configured to connect to a core network device through a link (for example, an Si interface), or connect to a network interface of another network device through a wired or wireless link (for example, an X2 interface) (not shown in the FIG. 5). This is not specifically limited in this embodiment of this application. In addition, for related description about the processor 501, the memory 502, and the transceiver 503, refer to description about the processor 601, the memory 602, and the transceiver 603 in the terminal device 60. Details are not described herein again.

Optionally, the network device 50 in this embodiment of this application is an apparatus for accessing a core network, a chip in an apparatus that may be configured to access a core network, or the like. This is not specifically limited in this embodiment of this application. The apparatus for accessing the core network may be, for example, a base station in a long term evolution (LTE) system (for example, the foregoing eMTC system or the foregoing NB-IoT system), a base station in a global system for mobile communications (GSM), a base station in a mobile telecommunications system (UMTS), a base station in a code division multiple access (CDMA) system or a future evolved public land mobile network (public land mobile network, PLMN), a broadband network gateway (BNG), an aggregation switch, a non-3GPP (non 3GPP) network device, a device with a structure similar to that in FIG. 5, or the like. The base station may include various types of base stations, for example, a macro base station, a micro base station (also referred to as a small cell), a relay station, and an access point. This is not specifically limited in this embodiment of this application.

Optionally, the network device 50 in this embodiment of this application may also be referred to as an access network device, an access device, or the like. This is not specifically limited in this embodiment of this application.

Optionally, the terminal device 60 in this embodiment of this application may be a device, for example, a terminal or a chip that can be used in a terminal, configured to implement a wireless communication function. This is not specifically limited in this embodiment of this application. The terminal may be user equipment (user equipment, UE), an access terminal, a terminal unit, a terminal station, a mobile station, a mobile station, a remote station, a remote terminal, a mobile device, a wireless communications device, a terminal agent, a terminal apparatus, or the like in an LTE system (for example, the foregoing eMTC system or the foregoing NB-IoT system), a GSM, a UMTS, a CDMA system, or a future evolved PLMN. The access terminal may be a cellular phone, a cordless phone, a session initiation protocol (SIP) phone, a wireless local loop (WLL) station, a personal digital assistant (personal digital assistant, PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control (industrial control), a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed position.

With reference to FIG. 1 to FIG. 5, the following describes in detail the data sending and receiving method provided in the embodiments of this application.

It should be noted that in the following embodiments of this application, names of messages between network elements, names of parameters in messages, or the like are merely examples, and there may be other names in specific implementations. This is not specifically limited in the embodiments of this application.

Figure 6:
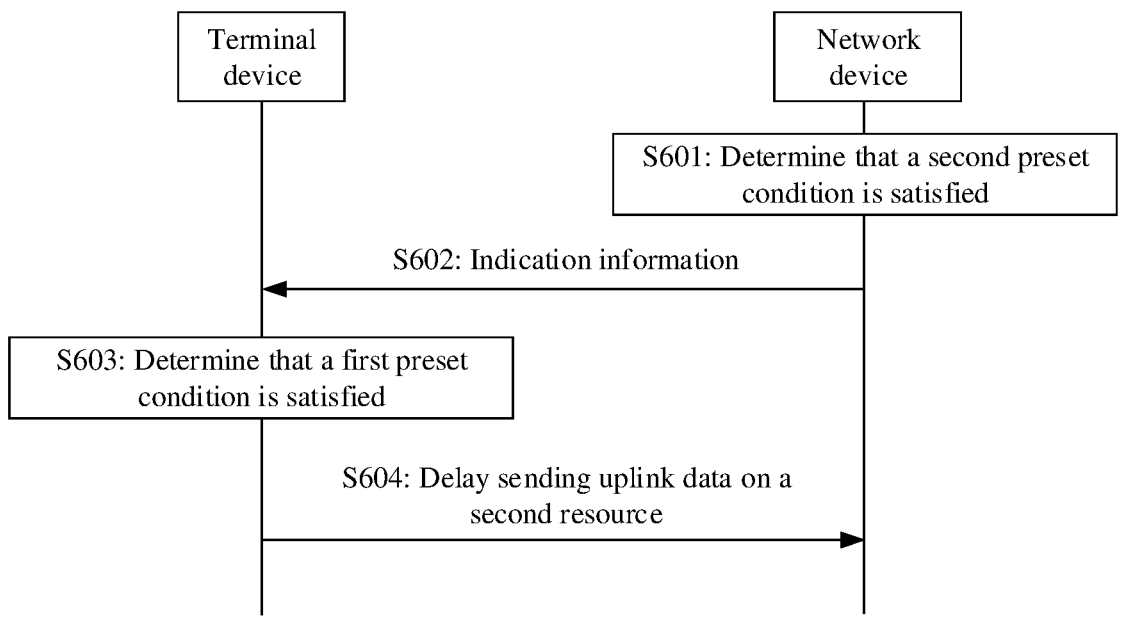
FIG. 6 is a schematic flowchart of a data sending and receiving method according to an embodiment of this application.

Interaction between the network device 50 and any terminal device 60 shown in FIG. 4 is used as an example. FIG. 6 shows a data sending and receiving method according to an embodiment of this application. The method includes the following steps.

S601: The network device determines that a second preset condition is satisfied.

Optionally, in a possible implementation, the second preset condition may include that the network device receives a random access preamble on an EDT physical random access channel resource, as shown in step S202 in the EDT procedure shown in FIG. 2.

Alternatively, optionally, in a possible implementation, the second preset condition may include that the network device receives a random access preamble on an EDT physical random access channel resource, and the network device sends an RAR to the terminal device, as shown in step S202 and step S203 in the EDT procedure shown in FIG. 2. Transmission of the random access preamble and transmission of the RAR may be in a same random access process.

Alternatively, optionally, in a possible implementation, the second preset condition may include that the network device receives a random access preamble on an EDT physical random access channel resource, the network device sends an RAR to the terminal device, and the network device receives a message 3, as shown in step S202 to step S204 in the EDT procedure shown in FIG. 2. Transmission of the random access preamble, transmission of the RAR, and transmission of the message 3 may be in a same random access process.

Alternatively, optionally, in a possible implementation, the second preset condition may include that the network device determines that the terminal device has performed an EDT procedure. The EDT procedure may be that shown in FIG. 2, and details are not described herein again.

Alternatively, optionally, in a possible implementation, the second preset condition may include that the network device determines that a higher layer of the terminal device triggers an EDT procedure. For example, the network device receives a random access preamble on an EDT physical random access channel resource.

In addition, the second preset condition may further be represented in another form. The second preset condition is not specifically limited in this embodiment of this application. The second preset condition is intended to illustrate that the terminal device has previously used the EDT physical random access channel resource. Therefore, when the network device learns that the terminal device does not support UP-EDT, if the second preset condition is satisfied, it may indirectly illustrate that the terminal device supports CP-EDT, thereby illustrating that the terminal device supports EDT. Certainly, if the terminal device supports the UP-EDT, because the UP-EDT has a capability reporting mechanism, to be specific, the terminal device notifies the network device that the terminal device supports the UP-EDT when the terminal device selects to support the UP-EDT, the network device can learn that the terminal device supports the UP-EDT. When the terminal device supports the UP-EDT, it is clear that the second preset condition is also satisfied. In conclusion, it may be considered that the terminal device supports the EDT provided that the network device determines that the second preset condition is satisfied.

For example, the EDT physical random access channel resource in this embodiment of this application may be, for example, an EDT-NPRACH resource. This is described herein, and details are not described below again.

S602: The network device sends indication information to the terminal device, where the indication information indicates a first resource used to transmit uplink data, and the first resource overlaps with an EDT physical random access channel resource. Correspondingly, the terminal device 60 receives the indication information from the network device 50.

In this embodiment of this application, an EDT physical random access channel resource is a periodic resource configured by the network device for the terminal device by using a system message. This is described herein, and details are not described below again. For example, the EDT physical random access channel resource may be the EDT-NPRACH resource.

In a possible implementation, for example, the indication information may be the UL grant in step S203 in an EDT procedure shown in FIG. 2. In this case, correspondingly, the first resource is a resource that is for the message 3 used for uplink data transmission and that is indicated by the UL grant. In other words, the resource for the message 3 used for the uplink data transmission herein overlaps with the EDT physical random access channel resource.

Alternatively, in a possible implementation, the indication information may be DCI received by the terminal device after the terminal device enters a connected mode or after the terminal device enters a connected mode through legacy random access process (legacy RACH) after the EDT procedure shown in FIG. 2. In this case, correspondingly, the first resource is a resource that is used for the uplink data transmission and that is indicated by the DCI. Optionally, a format of the DCI may be a DCI format No. The DCI format No is used to schedule the uplink data transmission, and includes a scheduling delay field used to indicate a start position of an NPUSCH, a repetition quantity field used to indicate a repetition quantity of data, and the like.

For example, the first resource in this embodiment of this application may be, for example, an NPUSCH resource. A format of the NPUSCH resource may be an NPUSCH format 1 or an NPUSCH format 2.

In an NB-IoT system, a resource that is used for uplink transmission and that corresponds to the NPUSCH format 1 or the NPUSCH format 2 may be that shown in the foregoing Table 1 or Table 2. In the foregoing Table 1 or Table 2, the NPUSCH format 1 is used to send data, and the NPUSCH format 2 is used to send an acknowledgement (ACK) or a negative acknowledgement (NACK). In a TDD NB-IoT system described in Table 2, for the NPUSCH format 1, when a subcarrier spacing is 3.75 kHz, a supported uplink/downlink subframe configuration includes a configuration 1 or a configuration 4. For the NPUSCH format 1, when a subcarrier spacing is 15 kHz, a supported uplink or downlink configuration includes a configuration 1, a configuration 2, a configuration 3, a configuration 4, or a configuration 5. For the configuration 1, the configuration 2, the configuration 3, the configuration 4, or the configuration 5, refer to the foregoing Table 3. Details are not described herein again. In addition, a case of the NPUSCH format 2 is similar to that of the NPUSCH format 1, and details are not described herein again.

It should be noted that, in this embodiment of this application, when the first resource is the NPUSCH resource, and the EDT physical random access channel resource is the EDT-NPRACH resource, that the first resource overlaps with the EDT physical random access channel resource means that any RE of the NPUSCH resource overlaps with the NPRACH resource. This is described herein, and details are not described below again.

S603: The terminal device determines that a first preset condition is satisfied.

Optionally, in a possible implementation, the first preset condition may include that the terminal device sends the random access preamble on an EDT physical random access channel resource, as shown in step S202 in the EDT procedure in FIG. 2.

Alternatively, optionally, in a possible implementation, the first preset condition may include that the terminal device has sent the random access preamble on an EDT physical random access channel resource.

Alternatively, optionally, in a possible implementation, the first preset condition may include that the terminal device sends the random access preamble on an EDT physical random access channel resource, and the terminal device receives an RAR from the network device, as shown in step S202 and step S203 in the EDT procedure in FIG. 2. Transmission of the random access preamble and transmission of the RAR may be in a same random access process.

Alternatively, optionally, in a possible implementation, the first preset condition may include that the terminal device sends the random access preamble on an EDT physical random access channel resource, the terminal device receives an RAR from the network device, and the terminal device sends a message 3, as shown in step S202 to step S204 in the EDT procedure in FIG. 2. Transmission of the random access preamble, transmission of the RAR, and transmission of the message 3 may be in a same random access process.

Alternatively, optionally, in a possible implementation, the first preset condition may include that the terminal device has performed an EDT procedure. The EDT procedure may be that shown in FIG. 2, and details are not described herein again.

Alternatively, optionally, in a possible implementation, the first preset condition may include that the higher layer of the terminal device triggers an EDT procedure. For example, the terminal device sends the random access preamble to the network device on an EDT physical random access channel resource.

In addition, the first preset condition may further be represented in another form. The first preset condition is not specifically limited in this embodiment of this application. The first preset condition is intended to illustrate that the terminal device has previously used the EDT physical random access channel resource, that is, the terminal device supports the EDT, including supporting the CP-EDT or the UP-EDT.

S604: The terminal device delays sending the uplink data to the network device on a second resource. Correspondingly, the network device delays receiving the uplink data from the terminal device on the second resource. The second resource does not overlap with the EDT physical random access channel resource.

In this embodiment of this application, because the uplink data is mapped to the NPUSCH, that the terminal device delays sending the uplink data to the network device on the second resource and that the network device delays receiving the uplink data from the terminal device on the second resource actually means that NPUSCH transmission (transmission) that carries the uplink data is delayed on the second resource. This is described herein, and details are not described below again.

For example, the second resource in this embodiment of this application may be, for example, an NPUSCH resource. A format of the NPUSCH resource may be the NPUSCH format 1 or the NPUSCH format 2. For related description, refer to the foregoing step S602. Details are not described herein again.

In other words, when the first resource overlaps with the early data transmission EDT physical random access channel resource, the uplink data is delayed to be sent on the second resource that does not overlap with the EDT physical random access channel resource. Herein, that the sending of the uplink data is delayed may be that the sending of the uplink data is delayed starting from a start resource of the uplink data, or may be that the sending of the uplink data is delayed starting from an intermediate resource of the uplink data. This is not specifically limited in this embodiment of this application. For example, that the terminal device delays sending the uplink data to the network device on the second resource may be, for example, that the EDT-NPRACH resource is separated from the NPUSCH resource in a postponing manner.

In this embodiment of this application, when the indication information in step S602 is the UL grant in step S203 in the EDT procedure shown in FIG. 2, the first resource is the resource that is for the message 3 used for the uplink data transmission and that is indicated by the UL grant. When the resource for the message 3 used for the uplink data transmission overlaps with the EDT physical random access channel resource, the message 3 is delayed to be sent on the second resource that does not overlap with the EDT physical random access channel resource.

In a possible implementation, the second resource includes m first resource blocks, and the EDT physical random access channel resource includes m second resource blocks, where a start position of an $i^{th}$ first resource block in the m first resource blocks is a next resource position of an end position of an $i^{th}$ second resource block in the m second resource blocks, m is a positive integer, and i is a positive integer not greater than m.

The second resource block in this embodiment of this application specifically corresponds to one periodic EDT physical random access channel resource. This is described herein, and details are not described below again.

Optionally, an end position of a $j^{th}$ first resource block in the m first resource blocks is a previous resource position of a start position of a $(j+1)^{th}$ second resource block in the m second resource blocks, and j is a positive integer less than m.

Figure 7:
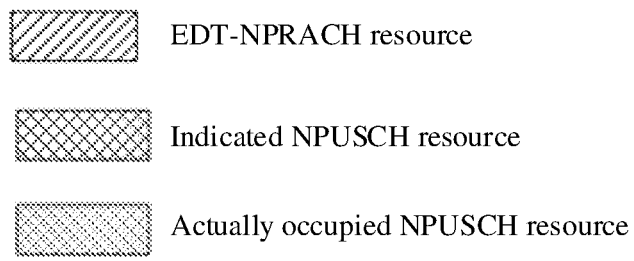
FIG. 7 is a first schematic diagram in which an EDT-NPRACH resource is separated from an NPUSCH resource in a postponing manner according to an embodiment of this application.
Figure 7:
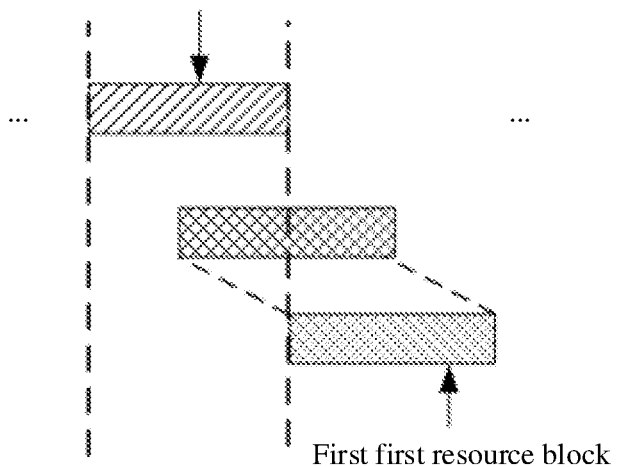

For example, the first resource is the indicated NPUSCH resource, and the EDT physical random access channel resource is the EDT-NPRACH resource. In this case, as shown in FIG. 7, the second resource (namely, an actually occupied NPUSCH resource) includes one first resource block (that is, m=1), and the EDT-NPRACH resource includes one second resource block. A start position of the first first resource block is a next resource position of an end position of the first second resource block, and an end position of the first first resource block is a resource position between the end position of the first second resource block and a start position of a next second resource block.

Figure 8:
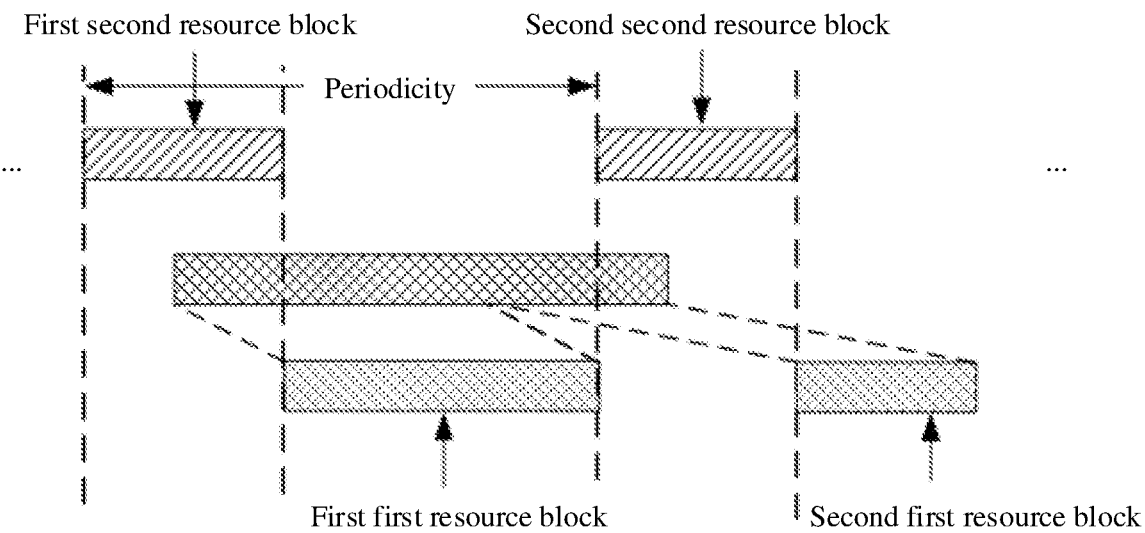
FIG. 8 is a second schematic diagram in which an EDT-NPRACH resource is separated from an NPUSCH resource in a postponing manner according to an embodiment of this application.

For example, the first resource is the indicated NPUSCH resource, and the EDT physical random access channel resource is the EDT-NPRACH resource. In this case, as shown in FIG. 8, the second resource (namely, an actually occupied NPUSCH resource) includes two first resource blocks (that is, m=2), and the EDT-NPRACH resource includes two second resource blocks. A start position of the first first resource block is a next resource position of an end position of the first second resource block, and an end position of the first first resource block is a previous resource position of a start position of the second second resource block. A start position of the second first resource block is a next resource position of an end position of the second second resource block, and an end position of the second first resource block is a resource position between the end position of the second second resource block and a start position of a next second resource block.

Figure 9:
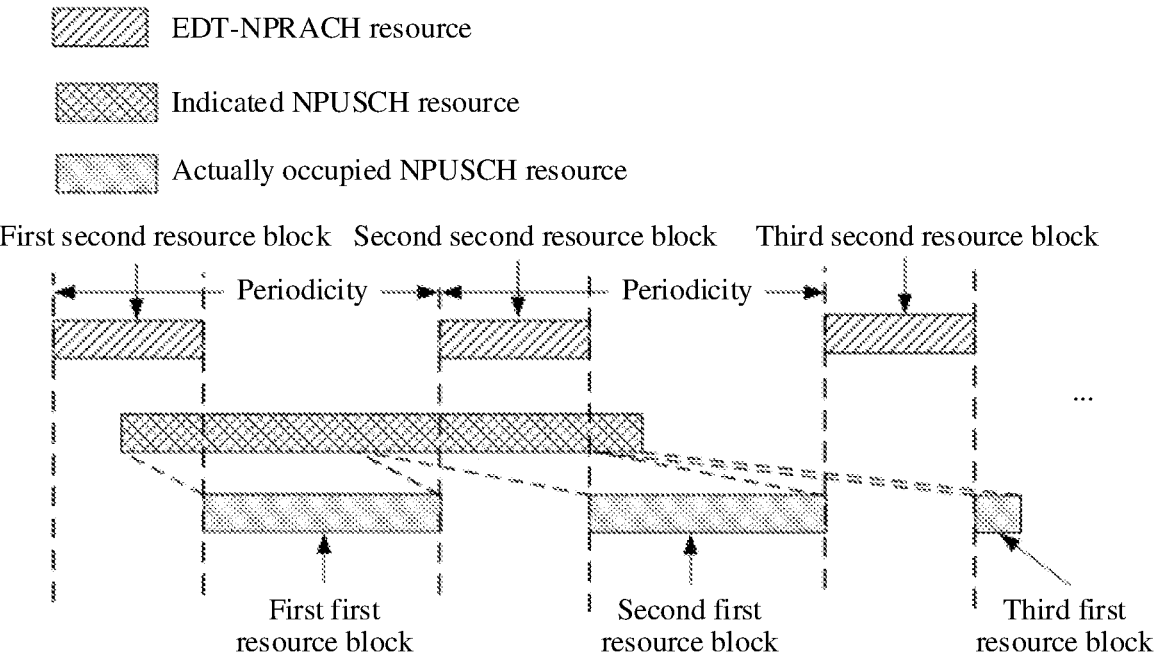
FIG. 9 is a third schematic diagram in which an EDT-NPRACH resource is separated from an NPUSCH resource in a postponing manner according to an embodiment of this application.

Alternatively, for example, the first resource is the indicated NPUSCH resource, and the EDT physical random access channel resource is the EDT-NPRACH resource. In this case, as shown in FIG. 9, the second resource (namely, an actually occupied NPUSCH resource) includes three first resource blocks (that is, m=3), and the EDT-NPRACH resource includes three second resource blocks. A start position of the first first resource block is a next resource position of an end position of the first second resource block, and an end position of the first first resource block is a previous resource position of a start position of the second second resource block. A start position of the second first resource block is a next resource position of an end position of the second second resource block, and an end position of the second first resource block is a previous resource position of a start position of the third second resource block. A start position of the third first resource block is a next resource position of an end position of the third second resource block, and an end position of the third first resource block is a resource position between the end position of the third second resource block and a start position of a next second resource block.

The foregoing examples shown in FIG. 7 to FIG. 9 all correspond to scenarios in which the sending of the uplink data is delayed starting from the start resource of the uplink data.

In another possible implementation, the second resource includes n+1 first resource blocks, and the EDT physical random access channel resource includes n second resource blocks. A start position of the first first resource block in the n+1 first resource blocks is the same as a start position of the first resource. A start position of an $(i+1)^{th}$ first resource block in the n+1 first resource blocks is a next resource position of an end position of an $i^{th}$ second resource block in the n second resource blocks, n is a positive integer, and i is a positive integer not greater than n.

Optionally, an end position of a $j^{th}$ first resource block in the n+1 first resource blocks is a previous resource position of a start position of a $j^{th}$ second resource block in the n second resource blocks, and j is a positive integer not greater than n.

Figure 10:
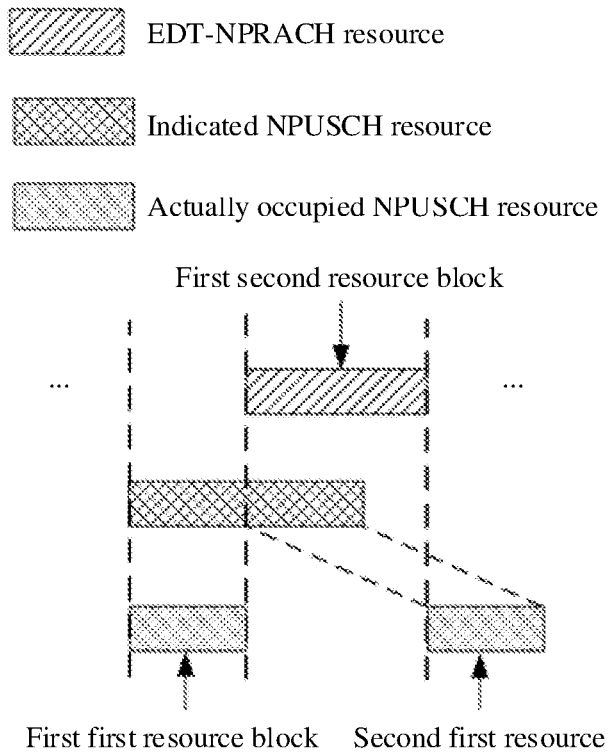
FIG. 10 is a fourth schematic diagram in which an EDT-NPRACH resource is separated from an NPUSCH resource in a postponing manner according to an embodiment of this application.

For example, the first resource is the indicated NPUSCH resource, and the EDT physical random access channel resource is the EDT-NPRACH resource. In this case, as shown in FIG. 10, the second resource (namely, an actually occupied NPUSCH resource) includes two first resource blocks (that is, n=1), and the EDT-NPRACH resource includes one second resource block. A start position of the first first resource block is the same as a start position of the first resource, and an end position of the first first resource block is a previous resource position of a start position of the first second resource block. A start position of the second first resource block is a next resource position of an end position of the first second resource block, and an end position of the second first resource block is a resource position between the end position of the first second resource block and a start position of a next second resource block.

Figure 11:
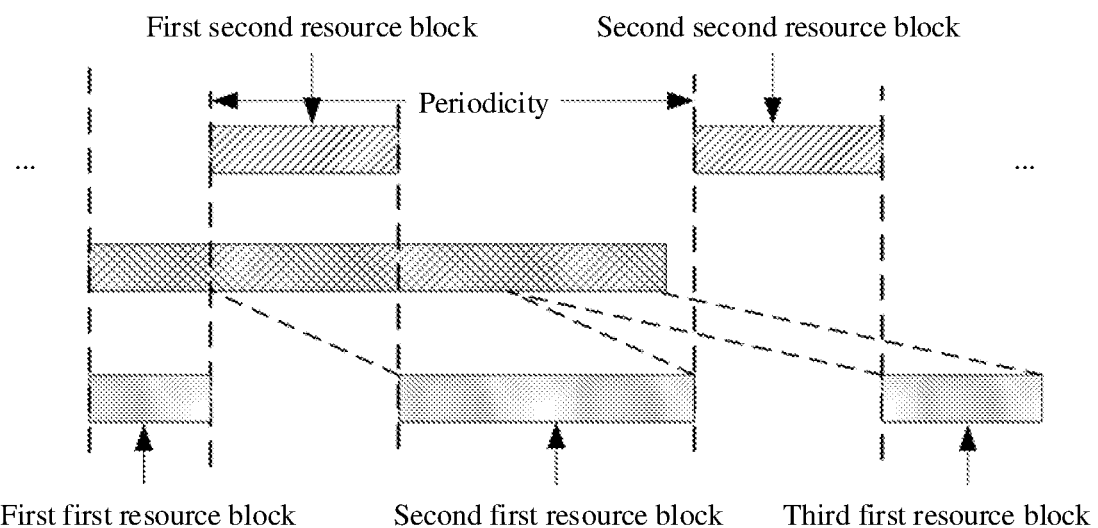
FIG. 11 is a fifth schematic diagram in which an EDT-NPRACH resource is separated from an NPUSCH resource in a postponing manner according to an embodiment of this application.

Alternatively, for example, the first resource is the indicated NPUSCH resource, and the EDT physical random access channel resource is the EDT-NPRACH resource. In this case, as shown in FIG. 11, the second resource (namely, an actually occupied NPUSCH resource) includes three first resource blocks (that is, n=2), and the EDT-NPRACH resource includes two second resource blocks. A start position of the first first resource block is the same as a start position of the first resource, and an end position of the first first resource block is a previous resource position of a start position of the first second resource block. A start position of the second first resource block is a next resource position of an end position of the first second resource block, and an end position of the second first resource block is a previous resource position of a start position of the second second resource block. A start position of the third first resource block is a next resource position of an end position of the second second resource block, and an end position of the third first resource block is a resource position between the end position of the second second resource block and a start position of a next second resource block.

The foregoing examples shown in FIG. 10 and FIG. 11 all correspond to scenarios in which the uplink data is delayed starting from the intermediate resource of the uplink data.

In conclusion, in this embodiment of this application, when the first resource overlaps with the EDT physical random access channel resource, the terminal device delays uplink sending of an overlapping part in the first resource to a next resource that does not overlap with the NPRACH resource.

Optionally, a resource position in this embodiment of this application may be a radio frame, a system frame, a super frame, a slot, a symbol, or the like. This is not specifically limited in this embodiment of this application.

Optionally, in this embodiment of this application, in an FDD NB-IoT system, for the NPUSCH format 1, when the uplink data is transmitted on the NPUSCH resource, a 40-ms gap is inserted every 256 ms, and after the 40-ms gap ends, the uplink data continues to be transmitted on the NPUSCH resource. In other words, the transmission of the uplink data on the NPUSCH resource needs to be postponed.

It is different from a current technology that when the terminal device supports the CP-EDT, but the network device does not know whether the terminal device supports the EDT, the EDT-NPRACH resource needs to be completely separated from the NPUSCH resource, thereby limiting flexibility of scheduling performed by the network device. In this embodiment of this application, the first resource used to transmit the uplink data may overlap with the EDT physical random access channel resource. The EDT physical random access channel resource may be, for example, the EDT-NPRACH resource, and the first resource may be, for example, the NPUSCH resource. When the first resource overlaps with the EDT physical random access channel resource, if the terminal device determines that the first preset condition is satisfied, or if the network device determines that the second preset condition is satisfied, the terminal device delays sending the uplink data to the network device on the second resource. Correspondingly, the network device delays receiving the uplink data from the terminal device on the second resource. In other words, if the terminal device determines that the first preset condition is satisfied, or if the network device determines that the second preset condition is satisfied, it may be considered that the terminal device supports the EDT. In this case, the first resource may overlap with the EDT physical random access channel resource, and the terminal device may send the uplink data to the network device in a postponing manner. Therefore, during data transmission, the flexibility of the scheduling performed by the network device can be improved, and a waste of resources can further be reduced.

The processor 501 in the network device 50 shown in FIG. 5 may invoke application program code stored in the memory 502, to indicate the network device to perform the actions of the network device in steps S601 to S604. The processor 601 in the terminal device 60 shown in FIG. 5 may invoke application program code stored in the memory 602, to indicate the terminal device to perform the actions of the terminal device in steps S601 to S604. This is not limited in this embodiment.

Optionally, in this embodiment of this application, if the network device determines that the preset condition is not satisfied, processing may be performed in an existing manner in which the EDT-NPRACH resource is completely separated from the NPUSCH resource. To be specific, the network device sends the indication information to the terminal device. The indication information indicates a third resource used to transmit the uplink data, and the third resource does not overlap with the EDT physical random access channel resource. Correspondingly, the terminal device receives the indication information from the network device, and then the terminal device sends the uplink data to the network device on the third resource. Correspondingly, the network device receives the uplink data from the terminal device on the third resource. For a related implementation, refer to the existing manner. Details are not described herein.

It should be noted that all the foregoing embodiments are described by using an example in which the data sending and receiving method is applied to the NB-IoT system. Certainly, the data sending and receiving method provided in the embodiments of this application may further be applied to an eMTC system. In this case, a corresponding solution is similar to the solution in the foregoing embodiments. A difference lies in that for example, the NPUSCH resource in the NB-IoT system is replaced with an eMTC-physical uplink shared channel (physical uplink shared channel, PUSCH) resource or a physical uplink control channel (physical uplink control channel, PUCCH) resource in the eMTC system, and the EDT-NPRACH resource in the NB-IoT system is replaced with an EDT random access resource that is in the eMTC system and that is configured by using edt-PRACH-ParametersListCE-r15 or EDT-PRACH-ParametersCE-r15 IE. In addition, a random access channel in the eMTC system is a PRACH. For other related description, refer to the foregoing embodiments. Details are not described herein again.

The foregoing mainly describes the solutions provided in the embodiments of this application from a perspective of interaction between the network elements. It may be understood that to implement the foregoing functions, the terminal device or the network device includes corresponding hardware structures and/or software modules for performing the functions. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, function modules of the terminal device or the network device may be divided based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely logical function division. During actual implementation, another division manner may be used.

Figure 12:
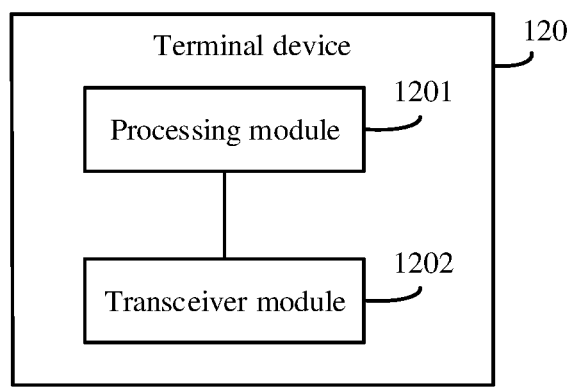
FIG. 12 is a schematic diagram of a structure of a terminal device according to an embodiment of this application.

For example, when function modules are obtained through division in an integrated manner, FIG. 12 is a schematic diagram of a structure of a terminal device 120. The terminal device 120 includes a processing module 1201 and a transceiver module 1202. The transceiver module 1202 is configured to receive indication information from a network device. The indication information indicates a first resource used to transmit uplink data, and the first resource overlaps with an EDT physical random access channel resource. The processing module 1201 is configured to determine that a preset condition is satisfied. The transceiver module 1202 is further configured to delay sending the uplink data to the network device on a second resource. The second resource does not overlap with the EDT physical random access channel resource.

Optionally, the preset condition may include that the terminal device sends a random access preamble on the EDT physical random access channel resource, and the terminal device receives an RAR from the network device. Alternatively, the preset condition may include that the terminal device has performed an EDT procedure.

All related content of the steps in the foregoing method embodiments may be cited in function description of a corresponding function module. Details are not described herein again.

In this embodiment, the terminal device 120 is presented with the function modules obtained through division in the integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the terminal device 120 may be in a form shown in FIG. 5.

For example, the processor 601 in FIG. 5 may invoke computer-executable instructions stored in the memory 602, so that the terminal device 120 performs the data sending method in the foregoing method embodiment.

Specifically, functions/implementation processes of the transceiver module 1202 and the processing module 1201 in FIG. 12 may be implemented by the processor 601 in FIG. 5 by invoking the computer-executable instructions stored in the memory 602. Alternatively, a function/an implementation process of the processing module 1201 in FIG. 12 may be implemented by the processor 601 in FIG. 5 by invoking the computer-executable instructions stored in the memory 602, and a function/an implementation process of the transceiver module 1202 in FIG. 12 may be implemented by the transceiver 603 in FIG. 5.

The terminal device 120 provided in this embodiment may perform the foregoing data sending method. Therefore, for a technical effect that can be achieved by the terminal device 120, refer to the foregoing method embodiment. Details are not described herein again.

Optionally, an embodiment of this application further provides an apparatus (for example, the apparatus may be a chip system). The apparatus includes a processor, configured to support a terminal device in implementing the foregoing data sending method, for example, determining that a preset condition is satisfied. In a possible design, the apparatus farther includes a memory. The memory is configured to store program instructions and data that are necessary for the terminal device. Certainly, the memory may alternatively not be in the apparatus. When the apparatus is a chip system, the apparatus may include a chip, or may include a chip and another discrete component. This is not specifically limited in this embodiment of this application.

Figure 13:
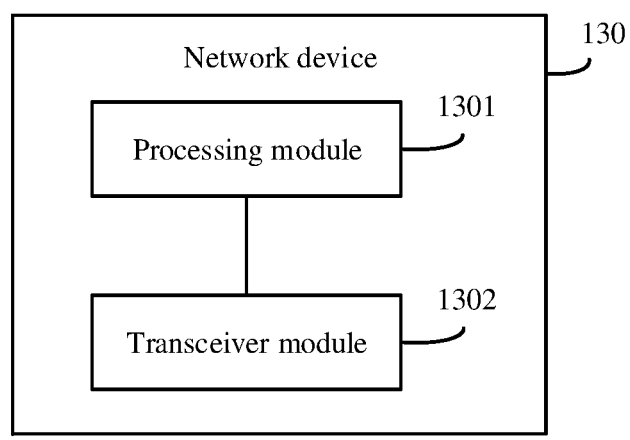
FIG. 13 is a schematic diagram of a structure of a network device according to an embodiment of this application.

Alternatively, for example, when function modules are obtained through division in an integrated manner, FIG. 13 is a schematic diagram of a structure of a network device 130. The network device 130 includes a processing module 1301 and a transceiver module 1302. The processing module 1301 is configured to determine that a preset condition is satisfied. The transceiver module 1302 is configured to send indication information to a terminal device. The indication information indicates a first resource used to receive uplink data, and the first resource overlaps with an EDT physical random access channel resource. The transceiver module 1302 is further configured to delay receiving the uplink data from the terminal device on a second resource. The second resource does not overlap with the EDT physical random access channel resource.

Optionally, the preset condition includes the network device receives a random access preamble on the EDT physical random access channel resource, and the network device sends an RAR to the terminal device. Alternatively, the preset condition may include that the network device determines that the terminal device has performed an EDT procedure.

All related content of the steps in the foregoing method embodiments may be cited in function description of a corresponding function module. Details are not described herein again.

In this embodiment, the network device 130 is presented with the function modules obtained through division in the integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the network device 130 may be in a form shown in FIG. 5.

For example, the processor 501 in FIG. 5 may invoke computer-executable instructions stored in the memory 502, so that the network device 130 performs the data receiving method in the foregoing method embodiment.

Specifically, functions/implementation processes of the transceiver module 1302 and the processing module 1301 in FIG. 13 may be implemented by the processor 501 in FIG. 5 by invoking the computer-executable instructions stored in the memory 502. Alternatively, a function/an implementation process of the processing module 1301 in FIG. 13 may be implemented by the processor 501 in FIG. 5 by invoking the computer-executable instructions stored in the memory 502, and a function/an implementation process of the transceiver module 1302 in FIG. 13 may be implemented by the transceiver 503 in FIG. 5.

The network device 130 provided in this embodiment may perform the foregoing data receiving method. Therefore, for a technical effect that can be achieved by the network device 130, refer to the foregoing method embodiment. Details are not described herein again.

Optionally, an embodiment of this application further provides an apparatus (for example, the apparatus may be a chip system). The apparatus includes a processor, configured to support a network device in implementing the foregoing data receiving method, for example, determining that a preset condition is satisfied. In a possible design, the apparatus further includes a memory. The memory is configured to store program instructions and data that are necessary for the network device. Certainly, the memory may alternatively not be in the apparatus. When the apparatus is a chip system, the apparatus may include a chip, or may include a chip and another discrete component. This is not specifically limited in this embodiment of this application.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

Although this application is described with reference to the embodiments, in a procedure of implementing this application that claims protection, a person skilled in the art may understand and implement another variation of the disclosed embodiments by viewing the accompanying drawings, disclosed content, and the appended claims. In the claims, "comprise" (comprising) does not exclude another component or another step, and "a" or "one" does not exclude a case of plurality. A single processor or another unit may implement several functions enumerated in the claims. Some measures are set forth in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely examples for description of this application defined by the appended claims, and are considered as any or all of modifications, variations, combinations, or equivalents that cover the scope of this application. It is clear that a person skilled in the art can make various modifications and variations to this application without departing from the spirit and scope of this application. In this way, this application is intended to cover these modifications and variations of this application provided that they fall within the scope defined by the following claims of this application and their equivalent technologies.

What is claimed is:

1. A data sending method, comprising:
receiving indication information from a network device, wherein the indication information indicates a first resource that is for a message 3 used to transmit uplink data, wherein the indication information is carried in a random access response (RAR), and wherein the first resource for the message 3 overlaps with a first early data transmission (EDT) physical random access channel resource; and delaying, in response to determining that transmission of the uplink data of the message 3 belongs to an EDT process, the transmission of the uplink data of the message 3 of the EDT process, wherein the delaying transmission of the uplink data of the message 3 of the EDT process comprises sending the uplink data of the message 3 of the EDT process to the network device on a second resource, wherein the second resource is non-overlapping with the first EDT physical random access channel resource, and wherein the sending the uplink data comprises sending at least a portion of the uplink data in a first resource block having a starting position that is after the first EDT physical random access channel resource and that is before a next EDT physical random access channel resource.

2. The method according to claim 1, wherein the message 3 is one of a radio resource control (RRC) early data request message, an RRC connection resume request message, an RRC connection request message, or an RRC connection reestablishment request message.

3. The method according to claim 1, wherein the delaying the transmission of the uplink data comprises sending the uplink data to the network device on the second resource without sending the uplink data on the first resource.

4. The method of claim 1, wherein the first resource block has a starting position that is immediately after the first EDT physical random access channel resource.

5. A data receiving method, comprising:
sending indication information to a terminal device, wherein the indication information indicates a first resource that is for a message 3 used to transmit uplink data, wherein the indication information is carried in a random access response (RAR) and wherein the first resource for the message 3 overlaps with a first early data transmission (EDT) physical random access channel resource; and delaying, in response to determining that transmission of the uplink data of the message 3 belongs to an EDT process, receiving the uplink data of the message 3 of the EDT process, wherein the delaying receiving the uplink data of the message 3 of the EDT process comprises receiving the uplink data of the message 3 of the EDT process from the terminal device on a second resource, and wherein the second resource is non-overlapping with the first EDT physical random access channel, and wherein the receiving the uplink data comprises receiving at least a portion of the uplink data in a first resource block having a starting position that is after the first EDT physical random access channel resource and that is before a next EDT physical random access channel resource.

6. The method according to claim 5, wherein the delaying the receiving of the uplink data comprises receiving the uplink data on the second resource without receiving the uplink data on the first resource.

7. The method according to claim 5, wherein the message 3 is one of a radio resource control (RRC) early data request message, an RRC connection resume request message, an RRC connection request message, or an RRC connection reestablishment request message.

8. The method of claim 5, wherein the first resource block has a starting position that is immediately after the first EDT physical random access channel resource.

9. A communications device, comprising:
a transceiver;
at least one processor; and
a non-transitory computer-readable storage medium storing a program to be executed by the at least one processor, the program including instructions to:
receive, through the transceiver, indication information from a network device, wherein the indication information indicates a first resource that is for a message 3 used to transmit uplink data, wherein the indication information is carried in a random access response (RAR), and wherein the first resource overlaps with a first early data transmission (EDT) physical random access channel resource; and
cause the transceiver to delay transmission of the uplink data of the message 3 in response to determining that transmission of the uplink data for the message 3 belongs to an EDT process, wherein delaying transmission of the uplink data of the message 3 of the EDT process comprises sending the uplink data of the message 3 of the EDT process to the network device on a second resource, wherein the second resource is non-overlapping with the first EDT physical random access channel resource, and wherein the sending the uplink data comprises sending at least a portion of the uplink data in a first resource block having a starting position that is after the first EDT physical random access channel resource and that is before a next EDT physical random access channel resource.

10. The communications device according to claim 9, wherein the instructions to delay the transmission of the uplink data include instructions to send the uplink data to the network device on the second resource without sending the uplink data on the first resource.

11. The communications device according to claim 9, wherein the message 3 is one of a radio resource control (RRC) early data request message, an RRC connection resume request message, an RRC connection request message, or an RRC connection reestablishment request message.

12. The communications device of claim 9, wherein the first resource block has a starting position that is immediately after the first EDT physical random access channel resource.

13. A communications device, comprising:
at least one processor; and
a non-transitory computer-readable storage medium storing a program to be executed by the at least one processor, the program including instructions to:
send indication information to a terminal device in response to the preset condition being satisfied, wherein the indication information indicates a first resource that is for a message 3 used to transmit uplink data, wherein the indication information is carried in a random access response (RAR), and wherein the first resource overlaps for the message 3 with a first EDT physical random access channel resource; and
delay receiving the uplink data of the message 3 in response to determining that transmission of the uplink data of the message 3 belongs to the EDT process, wherein delaying receiving the uplink data of the message 3 of the EDT process comprises receiving the uplink data of the message 3 of the EDT process from the terminal device on a second resource, wherein the second resource is non-overlapping with the first EDT physical random access channel resource, and wherein the receiving the uplink data comprises receiving at least a portion of the uplink data in a first resource block having a starting position that is after the first EDT physical random access channel resource and that is before a next EDT physical random access channel resource.

14. The communications device according to claim 13, wherein the instructions to delay the receiving of the uplink data include instructions to receive the uplink data on the second resource without receiving the uplink data on the first resource.

15. The communications device according to claim 13, wherein the message 3 is one of a radio resource control (RRC) early data request message, an RRC connection resume request message, an RRC connection request message, or an RRC connection reestablishment request message.

16. The communications device of claim 13, wherein the first resource block has a starting position that is immediately after the first EDT physical random access channel resource.

* * * * *